(12) United States Patent
Khan

(10) Patent No.: US 12,338,186 B2
(45) Date of Patent: Jun. 24, 2025

(54) IN-SITU SILICON OXYCARBIDE FORMATION IN CARBON-CARBON COMPOSITES

(71) Applicant: GOODRICH CORPORATION, Charlotte, NC (US)

(72) Inventor: Atta Khan, Riverside, CA (US)

(73) Assignee: GOODRICH CORPORATION, Charlotte, NC (US)

( * ) Notice: Subject to any disclaimer, the term of this patent is extended or adjusted under 35 U.S.C. 154(b) by 177 days.

(21) Appl. No.: 17/845,832

(22) Filed: Jun. 21, 2022

(65) Prior Publication Data

US 2023/0406782 A1 Dec. 21, 2023

(51) Int. Cl.
*C04B 41/45* (2006.01)
*C04B 35/52* (2006.01)
*C04B 35/56* (2006.01)

(52) U.S. Cl.
CPC .......... *C04B 41/4529* (2013.01); *C04B 35/52* (2013.01); *C04B 35/5603* (2013.01)

(58) Field of Classification Search
CPC .. C04B 41/4529; C04B 35/52; C04B 35/5603
See application file for complete search history.

(56) References Cited

U.S. PATENT DOCUMENTS

| | | | |
|---|---|---|---|
| 6,855,428 | B2 | 2/2005 | Lau et al. |
| 9,657,409 | B2 | 5/2017 | Sandgren et al. |
| 2004/0058154 | A1* | 3/2004 | Lau .................. C04B 35/62894 428/408 |
| 2010/0015332 | A1 | 1/2010 | Rollin et al. |

FOREIGN PATENT DOCUMENTS

| | | |
|---|---|---|
| CN | 112851383 | 5/2021 |
| CN | 112851383 A * | 5/2021 |
| EP | 1468976 | 5/2007 |
| EP | 1841714 | 4/2012 |

OTHER PUBLICATIONS

Feng et al. Diamond and Related Materials 102 (2020) (Year: 2020).*
Manocha et al. Eurasian ChemTech Journal 13 (2011) 41-47 (Year: 2011).*
Feng T et al, "Optimizing PyC matrix interface to improve mechanical properties of carbon/ carbon composites by rod-like SiOC ceramic", Diamond and Related Materials, Elsevier Science Publishers, Amsterdam, NL, vol. 102, dated Dec. 27, 2019, XP086002134, DOI: 10.1016/J.DIAMOND.2019.107673, retrieved on Dec. 27, 2019.

(Continued)

*Primary Examiner* — Kelly M Gambetta
(74) *Attorney, Agent, or Firm* — SNELL & WILMER L.L.P.

(57) ABSTRACT

A method of making a carbon-carbon composite may comprise forming a silicon oxycarbide (SiOC) precursor sol and infiltrating a fibrous preform with the SiOC precursor sol. A SiOC forming heating treatment may be performed on the fibrous preform to form SiOC particles. The fibrous preform may be densified using chemical vapor infiltration to form a densified fibrous preform.

18 Claims, 6 Drawing Sheets

(56) References Cited

OTHER PUBLICATIONS

Liu Chen et al, "Carbon-bonded carbon fiber composites reinforced with SiOC-based polymer derived ceramics: Microstructure and properties", Materials Letters, Elsevier, Amsterdam, NL, vol. 318, dated Apr. 6, 2022, XP087030314, DOI: 10.1016/J.MATLET.2022. 132233, Retrieved on Apr. 6, 2022.

Sun Yuegi et al, "Preparation and properties of SiOC ceramic modified carbon fiber needled felt preform composites", Ceramics International, Elsevier, Amsterdam, NL, vol. 46, No. 2, dated Sep. 17, 2019, pp. 1743-1749, XP085919596, DOI: 10.1016/J.CERAMINT. 2019.09.148 Retrieved on Sep. 17, 2019.

European Patent Office, European Search Report dated Nov. 30, 2023 in Application No. 23180427.9.

* cited by examiner

IN-SITU SILICON OXYCARBIDE FORMATION IN CARBON-CARBON COMPOSITES

FIELD

The present disclosure relates generally to composites and, more specifically, to carbon-carbon composites and methods of forming carbon-carbon composites.

BACKGROUND

Aircraft brake systems typically employ a series of brake disks that, when forced into contact with each other, help to stop the aircraft. The brake disks may comprise a carbon fiber-reinforced/carbon matrix (C/C) composite. For example, in a brake system, the rotor friction disks, stator friction disks, pressure plates, and/or end plates may be comprised of C/C composite. C/C composite tends to have a relatively high wear rate. One way to reduce the wear rate of C/C composites is to add ceramic particles to the C/C composite material. However, ceramic particles tend to increase friction, which can lead to increased vibration during braking.

SUMMARY

A method of making a carbon-carbon composite is disclosed, in accordance with various embodiments. The method includes forming a silicon oxycarbide (SiOC) precursor sol, infiltrating a fibrous preform with the SiOC precursor sol, performing a SiOC forming heating treatment on the fibrous preform to form SiOC particles, and densifying the fibrous preform by chemical vapor infiltration (CVI) to form a densified fibrous preform.

In various embodiments, forming the SiOC precursor sol comprises combining alkyltrimethoxysilane and a carrier fluid.

In various embodiments, the carrier fluid is water.

In various embodiments, performing the SiOC forming heating treatment on the fibrous preform comprises heating the fibrous preform at a temperature of between 700° C. and 1200° C.

In various embodiments, performing the SiOC forming heating treatment on the fibrous preform further comprises heating the fibrous preform in a presence of an inert gas.

In various embodiments, the SiOC forming heating treatment is performed for between 0.5 and 5 hours.

In various embodiments, the method further comprises partially densifying the fibrous preform prior to infiltrating the fibrous preform with the SiOC precursor sol.

In various embodiments, the method further comprises partially densifying the fibrous preform. In various embodiments, infiltrating the fibrous preform with the SiOC precursor sol comprises performing a first infiltration of the fibrous preform with the SiOC precursor sol prior to partially densifying the fibrous preform, and performing a second infiltration of the fibrous preform with the SiOC precursor sol after partially densifying the fibrous preform.

A carbon-carbon composite is disclosed, comprising a plurality of carbon fibers, a carbon matrix surrounding the carbon fibers, and a plurality of silicon oxycarbide (SiOC) particles dispersed in the carbon matrix.

In various embodiments, the SiOC particles form between 0.5% and 10.0% of a weight percentage of the carbon-carbon composite.

In various embodiments, the carbon-carbon composite has a density of at least 1.75 g/cc.

In various embodiments, the SiOC particles form about 4.0% of the weight percentage of the carbon-carbon composite.

A method of making a carbon-carbon composite is disclosed, in accordance with various embodiments. The method comprises partially densifying a fibrous preform, infiltrating the fibrous preform with a first silicon oxycarbide (SiOC) precursor sol, performing a first SiOC forming heating treatment on the fibrous preform, and densifying the fibrous preform to form a fully densified fibrous preform.

In various embodiments, the method further comprises performing a first heat treatment on the fibrous preform prior to partially densifying the fibrous preform, and performing a second treatment on the fully densified fibrous preform.

In various embodiments, the method further comprises infiltrating the fibrous preform with a second SiOC precursor suspension prior to partially densifying the fibrous preform.

In various embodiments, the method further comprises performing a second SiOC forming heating treatment on the fibrous preform after infiltrating the fibrous preform with the second SiOC precursor sol and prior to partially densifying the fibrous preform.

In various embodiments, the method further comprises forming the first SiOC precursor sol by combining methyltrimethoxysilane and a carrier fluid.

In various embodiments, the carrier fluid is water.

In various embodiments, performing the first SiOC forming heating treatment on the fibrous preform comprises heating the fibrous preform at a temperature of between 700° C. and 1300° C.

In various embodiments, the SiOC particles forms between 0.5% and 10.0% of the weight percentage of the fully densified fibrous preform.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

Figure 1:
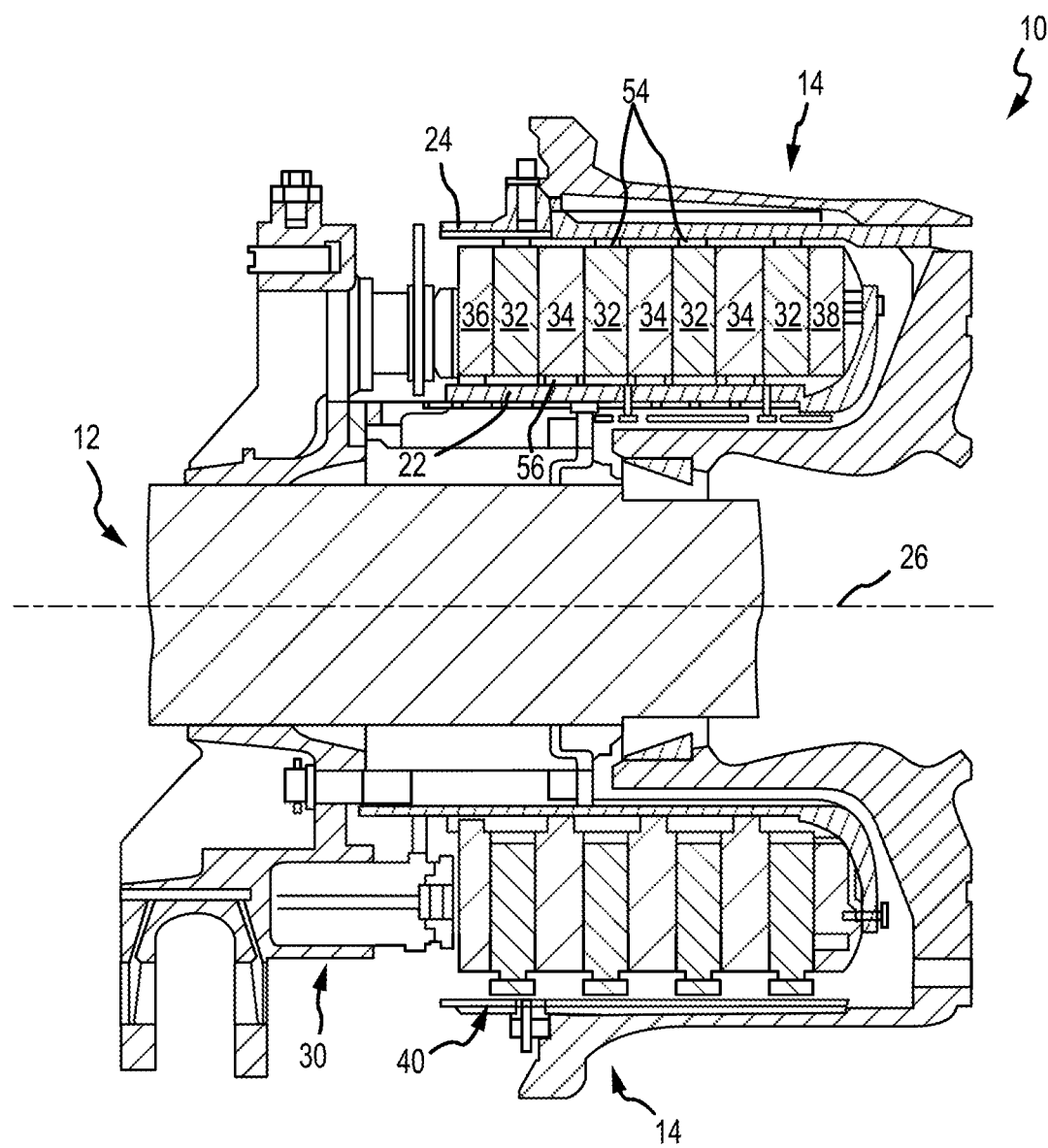
FIG. 1 illustrates a cross sectional view of an aircraft wheel braking assembly, in accordance with various embodiments.

The detailed description of embodiments herein makes reference to the accompanying drawings, which show embodiments by way of illustration. While these embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not for limitation. For example, any reference to singular includes plural embodiments, and any reference to more than one component or step may include a singular embodiment or step. Also, any reference to attached, fixed, connected or the like may include permanent, removable, temporary, partial, full and/or any other possible attachment option. Further, any steps in a method discussed herein may be performed in any suitable order or combination.

Disclosed herein is a C/C composite having Silicon Oxycarbide (SiOC) particles distributed therein and methods for making the same. Incorporating SiOC particles in C/C composites tends to improve the wear resistance of the C/C composite. SiOC particles have a thermal expansion closer to that of carbon/carbon. In accordance with various embodiments, the SiOC particles are formed by applying an SiOC precursor sol during one or more stages of the carbon/carbon fabrication and performing one or more heat treatments to form the SiOC particles With reference to FIG. 1, a wheel braking assembly 10 such as may be found on an aircraft is illustrated, in accordance with various embodiments. Aircraft wheel braking assembly 10 may comprise a bogie axle 12, a wheel 14, a torque tube 22, one or more torque bars 24, a wheel rotational axis 26, an actuator 30, brake rotors 32, brake stators 34, a pressure plate 36, an end plate 38, a heat shield 40, multiple rotor lugs 54, and multiple stator slots 56.

Rotors 32 are interleaved with stators 34. Rotors 32 are secured to torque bars 24 for rotation with wheel 14, while stators 34 are engaged with torque tube 22. At least one actuator is operable to compress interleaved rotors 32 and stators 34 for stopping the aircraft. Pressure plate 36 and end plate 38 are disposed at opposite axial ends of the interleaved rotors 32 and stators 34. Through compression of interleaved rotors 32 and stators 34 between pressure plates 36 and end plate 38, the resulting frictional contact slows rotation of wheel 14.

In accordance with various embodiments, one or more of the friction disks (e.g., one or more of rotors 32, stators 34, pressure plate 36, and end plate 38) may be formed of a C/C composite having SiOC particles distributed therein. The C/C composites may operate as heat sinks to absorb large amounts of kinetic energy converted to heat during slowing of the aircraft. While the disclosed methods and C/C composites may find particular use in connection with aircraft brake disks, various aspects of the disclosed embodiments may be adapted for manufacturing a variety of C/C composite components. For example, the disclosed methods and C/C composites may be used to form other C/C aircraft components that would benefit from improved wear and/or C/C components in other industries. As such, numerous applications of the present disclosure may be realized.

Figure 2:
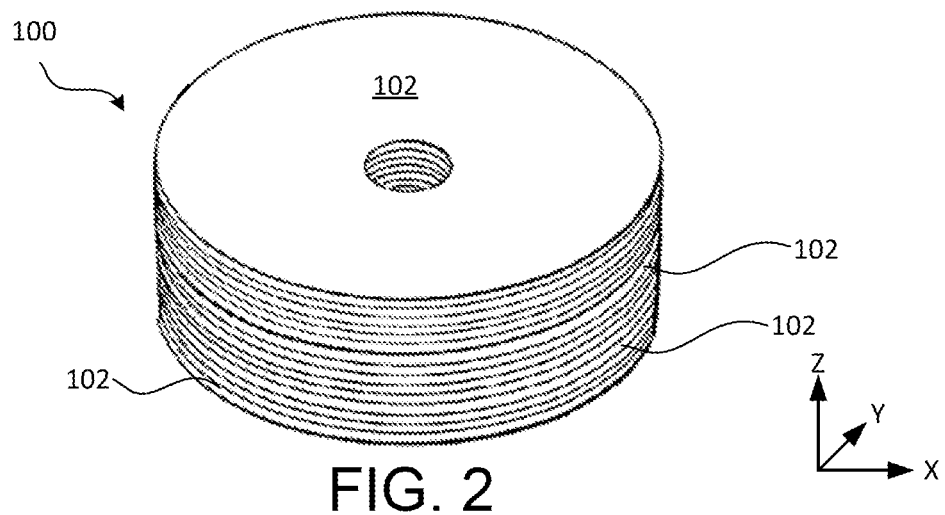
FIG. 2 illustrates a fibrous preform, in accordance with various embodiments.

Referring now to FIG. 2, a fibrous preform 100, which may be used to fabricate one or more of the friction disks of FIG. 1 is illustrated, in accordance with various embodiments. Fibrous preform 100 may comprise a porous structure comprised of a plurality of stacked textile layers 102. As used herein, a porous structure includes any structure derived from a fibrous material such as carbon fibers or the like. In various embodiments, the carbon fibers may be derived from polyacrylonitrile (PAN), rayon (synthetic fiber derived from cellulose), oxidized polyacrylonitrile fiber (OPF), pitch, or the like. The starting fiber may be pre-oxidized PAN or fully carbonized commercial carbon fiber. Fibrous preform 100 may be prepared by needling the textile layers 102 of fibrous preform 100. Needling the textile layers 102 tends to push fibers from one layer 102 into the next layer 102, thereby forming z-fibers that extend perpendicularly across the layers 102. After needling, fibrous preform 100 may comprise fibers extending in three different directions (i.e., in the x and y directions and the z direction).

Figure 3:
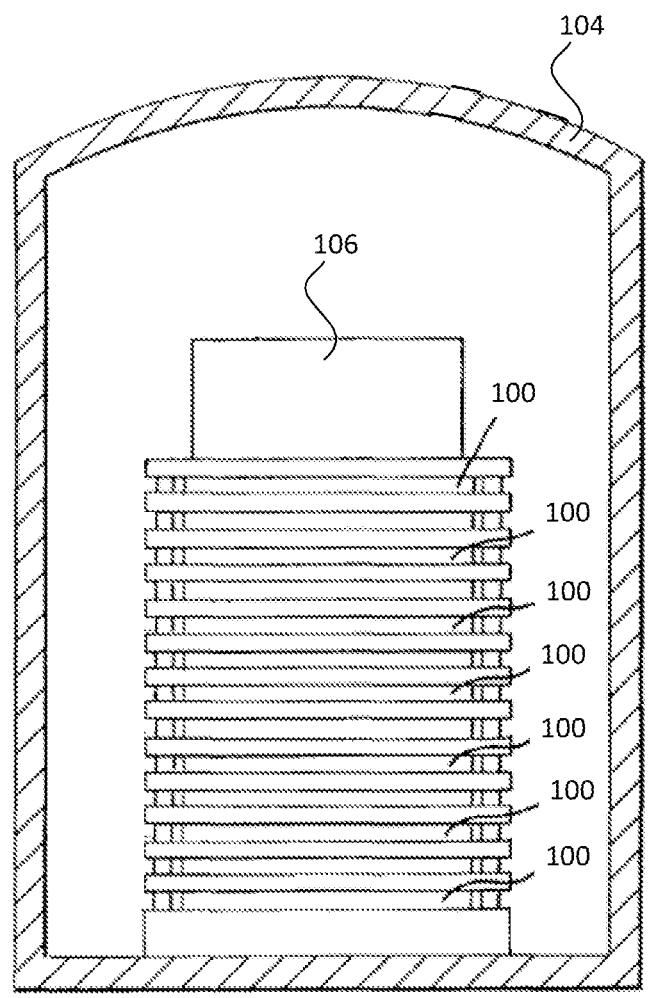
FIG. 3 illustrates fibrous preforms in a carbonization furnace, in accordance with various embodiments.

As shown in FIG. 3, fibrous preforms 100 may be placed in a furnace 104 for carbonization. The carbonization process may be employed to convert the fibers of the fibrous preforms 100 into pure carbon fibers, as used herein only "pure carbon fibers" means carbon fibers comprised of at least 99% carbon. The carbonization process is distinguished from the densification process, described below, in that the densification process involves infiltrating the pores of the fibrous preform 100 and depositing a carbon matrix within and around the carbon fibers of the fibrous preform 100, and the carbonization process refers to the process of converting the fibers of the fibrous preform 100 into pure carbon fibers.

Figure 4:
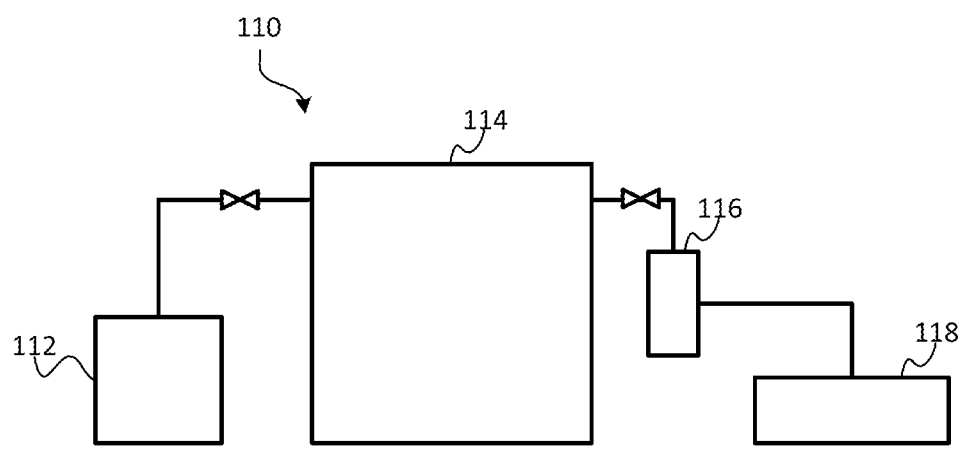
FIG. 4 illustrates an exemplary preform infiltration system, in accordance with various embodiments.

As described in further detail below, the fibrous preform 100 may be infiltrated with a SiOC precursor preparation. In accordance with various embodiments, the SiOC precursor preparation may be a sol formed by mixing water and an alkyltrimethoxysilane (e.g., methyltrimethoxysilane ("MTMS")). With reference to FIG. 4, an exemplary preform infiltration system 110 is shown, in accordance with various embodiments. System 110 may include a fluid reservoir 112 for storing and delivering the SiOC precursor suspension into the vacuum chamber 114. Vacuum chamber 114 is equipped with a tank in which the fibrous preforms 100 (FIG. 2) may be located. Vacuum pump 118 and trap 116 are used to first evacuate the porosity of the fibrous preforms 100 and subsequently facilitate drawing the SiOC precursor suspension into the tank containing the parts to be infiltrated (e.g., the fibrous preforms 100). In various embodiments, following infiltration, the fibrous preforms 100 are removed and dried in a separate oven. In various embodiments, the SiOC precursor preparation may be applied by dipping the fibrous preform 100 in the sol or by any other suitable application method.

After infiltrating the fibrous preform 100 with the SiOC precursor, the infiltrated fibrous preform 100 may undergo heat treatment and a series of densification cycles. In accordance with various embodiments, the incorporation of SiOC precursors throughout the fibrous preform 100 or throughout a partially densified fibrous preform may lead to the formation of SiOC particles during the subsequent heat treatments and carbon densification cycles. Additives such as a wetting agent may be included in the SiOC precursor suspension to facilitate wetting of the preform or of the partially densified fibrous preform. During subsequent heat treatments of the fibrous preform, which, in various embodiments, may be performed in the presence of nitrogen gas, the SiOC precursors are transformed into SiOC particles. In various embodiments, the SiOC particles may comprise an average particle size of less than 500 nm, less than 250 nm, less than 100 nm and or less than 50 nm (e.g., an average particle size of between 10 nm and 500, between 10 nm and 250 nm, between 10 nm and 100, or between 10 and 50 nm). In various embodiments, the SiOC particles may comprise an average particle size of between 0.5 micrometers and 5 micrometers.

Figure 5:
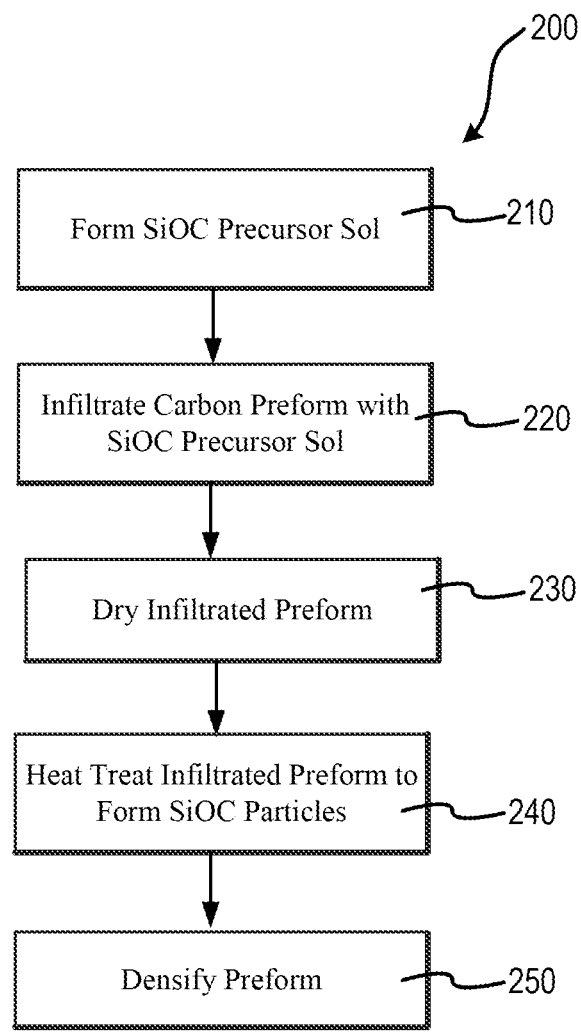
FIG. 5 illustrates a method of forming a C/C composite having SiOC particles, in accordance with various embodiments.

With reference to FIG. 5, a method 200 for making a C/C composite having SiOC particles is shown, in accordance with various embodiments. Method 200 may be employed to form one or more of the friction disks of FIG. 1. In accordance with various embodiments, method 200 includes forming a SiOC precursor sol (Step 210). The SiOC precursor sol may be formed by combining an alkyltrimethoxysilane with a carrier fluid such as, for example, water, and stirring SiOC precursor sol, for between about 10 minutes and about 60 minutes, or for about 30 minutes (as used in the previous context only the term "about" means±15 minutes).

In accordance with various embodiments, the alkyltrimethoxysilane may be transformed into SiOC particles through a transformation into gel, followed by decomposition in a nitrogen environment, as described in Step 240 below. The concentration of the alkyltrimethoxysilane and the viscosity of the SiOC sol may be adjusted by adding additional water to the sol.

In accordance with various embodiments, method 200 further comprises infiltrating the fibrous preform with the SiOC precursor sol (Step 220). In various embodiments, infiltration may be conducted by immersing the fibrous preform in the aqueous SiOC precursor sol. In various embodiments, infiltration may be conducted following evacuation of the pores of the fibrous preform using a vacuum chamber. For example, the fibrous preform may be infiltrated with the SiOC precursor sol using system 110 in FIG. 4.

In various embodiments, following infiltration, the fibrous preform may be dried to remove water and/or any other carrier fluid (Step 230). The SiOC precursors may increase a weight of the dry preform by between 10% and 50%. In this regard, after drying, the weight of the infiltrated fibrous preform may be between 10% and 50% greater than the weight of the fibrous preform prior to infiltration (i.e., prior to Step 220). In various embodiments, the ratio of alkyltrimethoxysilane to water in the SiOC precursor sol may be selected between 10% and 50%. As used in the previous context only, the term about means±5%. The target weight percentage increase may provide a volume of SiOC particles that improve the wear of the final C/C composite component without negatively impacting the mechanical properties (e.g., friction) of the C/C composite component. In various embodiments, the SiOC particles may form between 0.5% and 10.0%, between 0.5% and 5%, between 3.0% and 5.0%, or about 4.0% of the total weight of the final C/C composite. As used in the previous context only, the term "about" means±0.5%

In various embodiments, the infiltrated fibrous preform may undergo a heat treatment (Step 240). Step 240 may include heat treating the infiltrated fibrous preform to a suitable temperature to transform the SiOC precursors into SiOC particles. In various embodiments, the heat treatment (also referred to herein as a "SiOC forming heat treatment") is performed in the presence of an inert gas (e.g., nitrogen gas). Step 240 may be conducted in a separate furnace or during the ramp up to the temperature of the carbon densification cycle(s) (as described below in Step 250). In various embodiments, the SiOC forming heat treatment may comprise heat treating the infiltrated fibrous preform in the presence of nitrogen gas and at a temperature of between 700° C. and 1300° C. (between 1292° F. and 2372° F.) for between 0.5 hour and 5.0 hours. In various embodiments, the SiOC forming heat treatment may comprise heat treating the infiltrated fibrous preform in the presence of nitrogen gas and at a temperature of between 700° C. and 1200° C. (between 1292° F. and 2192° F.) for between 0.5 hour and 5.0 hours. In various embodiments, the SiOC forming heat treatment may comprise heat treating the infiltrated fibrous preform in the presence of nitrogen gas and at a temperature of between 1000° C. and 1200° C. (between 1832° F. and 2192° F.) for between 0.5 and 2.0 hours. In various embodiments, the SiOC forming heat treatment may comprise heat treating the infiltrated fibrous preform in the presence of nitrogen gas and at a temperature of about 1050° C. (1922° F.) for about 1.0 hour. As used in the previous context only, the term "about" means±25° C. (±77° F.). In accordance with various embodiments, heating the infiltrated preform in the presence of an inert gas (e.g. nitrogen gas) may initiate the transformation of the SiOC precursors into SiOC particles. In this regard, at least a portion of the SiOC particles may be formed during the heat treatment (e.g., during Step 240).

In various embodiments, after heat treating the infiltrated fibrous preform (e.g., after Step 240) one or more densification cycles may be performed (Step 250). Step 250 results in a C/C composite (also referred to herein as a densified fibrous preform). In various embodiments, the densification is done using chemical vapor infiltration (CVI). During densification, the carbon matrix is formed by depositing carbon on and around the carbon fibers. In various embodiments, densification may comprise a single CVI cycle. In various embodiments, densification may include multiple CVI cycles. Each CVI cycle may be followed by a heat treatment. In various embodiments, the SiOC particles may form between about 0.5% and about 10.0%, between about 0.5% and about 5%, and/or between about 3.0% and about 5.0% of the total weight of the final C/C composite. As used in the previous context only, the term "about" means±0.5%. In various embodiments, the final C/C composite may have a final density of at least 1.75 g/cc. In various embodiments, the final C/C composite may have a final density of at least 1.8 g/cc.

Figure 6A:
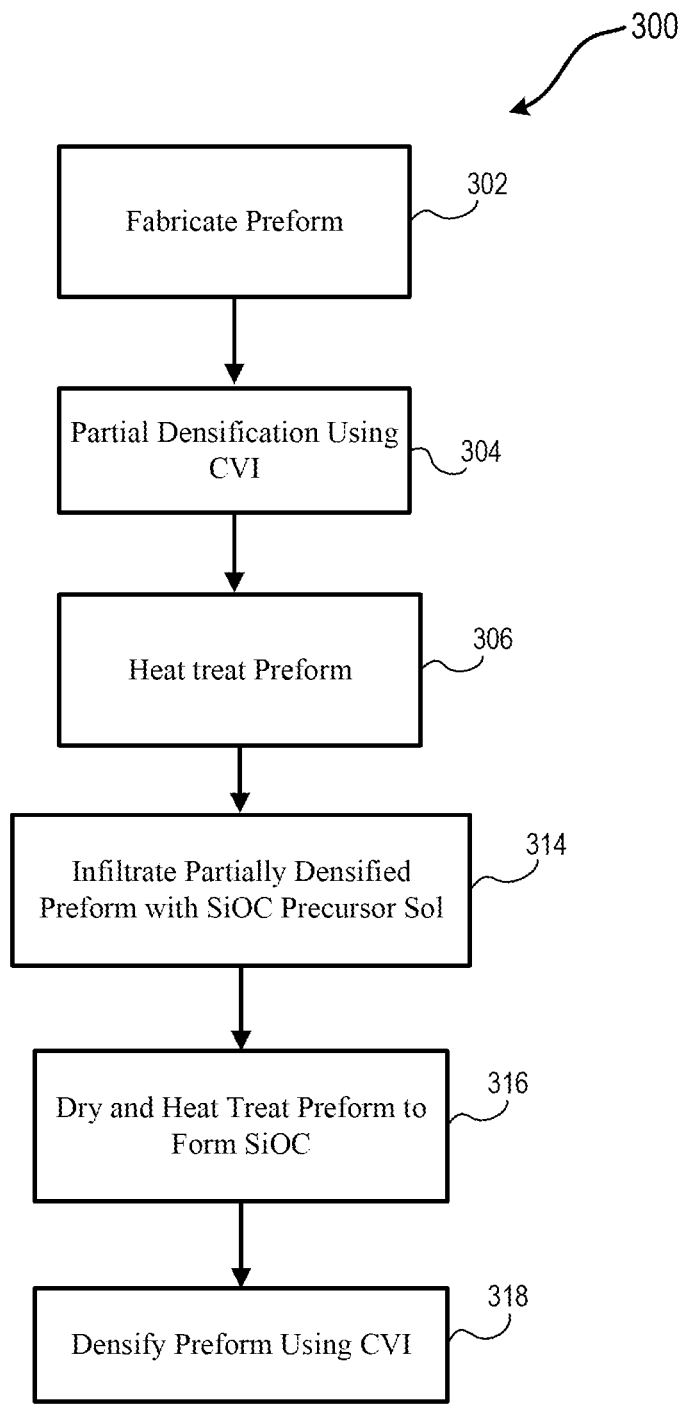
FIG. 6A illustrates a method of forming a C/C composite having SiOC particles by applying a SiOC precursor sol following a partial densification, in accordance with various embodiments.

With reference to FIG. 6A, in various embodiments, a method 300 for making a C/C composite having SiOC particles is shown, in accordance with various embodiments. Method 300 may be employed to form one or more of the friction disks of FIG. 1. In accordance with various embodiments, method 300 may include forming a fibrous preform (Step 302). Step 302 may include carbonizing the fibrous preform such that the carbon fibers of the preform are at least 99% carbon. In various embodiments, a weight 106 (FIG. 3) may apply pressure to the fibrous preforms during carbonization. The application of pressure may increase the fiber volume of the carbonized fibrous preforms.

The fibrous preform may then be partially densified using CVI (Step 304). The partial densification may cause a portion of the porosity of the fibrous preform to be filled/densified with the carbon matrix. The partially densified fibrous preform may then heat treated (Step 306) prior to infiltration and densification. Stated differently, after carbonization and prior to infiltration and densification, the fibrous preform may undergo a (first) heat treatment. The first heat treatment of Step 304 may comprise heat treating the fibrous preform at a temperature of between 1600° C. and 2600° C. (between 2912° F. and 4712° F.) for between 1.0 hour and hours. In various embodiments, the first heat treatment may comprise heat treating the fibrous preform at a first temperature of between 1800° C. and 2400° C. (between 3272° F. and 4352° F.) for between 4.0 and 20.0 hours.

The partially densified fibrous preform may then be infiltrated with a SiOC precursor sol (Step 314). Step 314 may be similar to Step 220, described above with reference to method 200. In accordance with various embodiments, the SiOC precursor sol may include a mixture of alkyltrimethoxysilane and water. In various embodiments, the SiOC precursor sol may be formed as described above with reference to Step 210 of method 200.

After infiltration, the infiltrated fibrous preform is dried and heat treated (Step 316). Step 316 may be similar to drying Step 230 and/or SiOC forming heat treatment Step 240, described above with reference to method 200. SiOC particles may be, at least, partially formed during Step 316. The fibrous preform, which now includes SiOC particles may then be further densified using CVI (Step 318). Step 318 may be similar to Step 250, described above with reference to method 200. In various embodiments, the final C/C composite may have a final density of at least 1.75 g/cc. In various embodiments, the final C/C composite may have a final density of at least 1.8 g/cc.

Figure 6B:
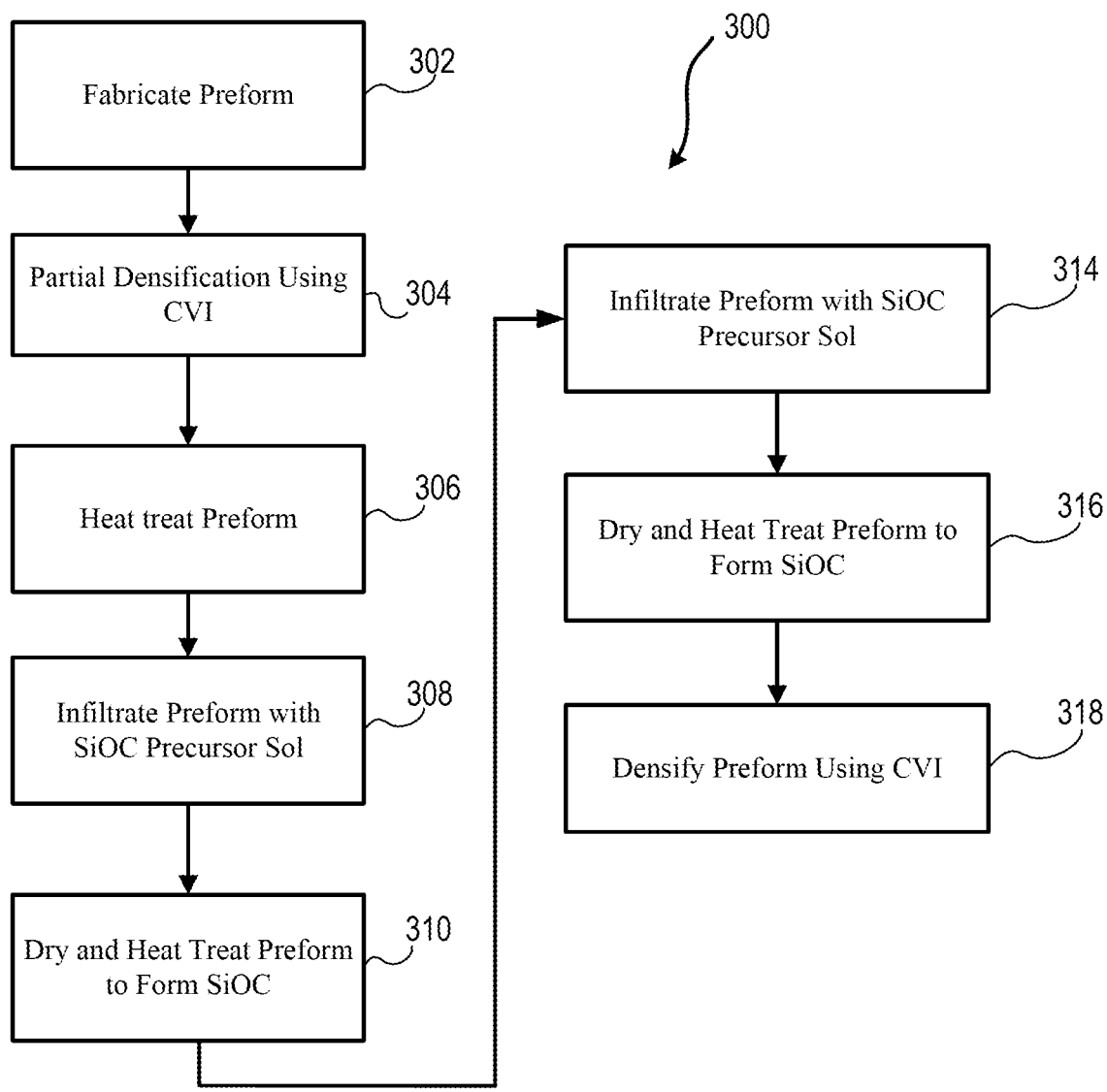
FIG. 6B illustrates a method of forming a C/C composite having SiOC particles by applying a SiOC precursor sol at multiple times during C/C formation, in accordance with various embodiments.

With reference to FIG. 6B, in various embodiments, method 300 may include multiple infiltration steps and/or additional heat treatments. For example, after densification (Step 304) and heat treatment (Step 306), described above with respect to FIG. 6A, the partially densified, fibrous carbonized preform may be densified with a SiOC precursor sol (Step 308). Step 308 may be similar to Step 220, described above with reference to method 200. In accordance with various embodiments, the SiOC precursor sol may include a mixture of alkyltrimethoxysilane and water. In various embodiments, the SiOC precursor sol may be formed as described above with reference to Step 210 of method 200.

After infiltration, the infiltrated fibrous preform may be dried and/or heat treated (Step 310). Step 310 may be similar to drying Step 230 and/or SiOC forming heat treatment Step 240, described above with reference to method 200. SiOC particles may be, at least, partially formed during Step 310. The fibrous preform, which now includes SiOC particles may then be infiltrated with a SiOC precursor sol (Step 314). Step 314 may be similar to Step 220, described above with reference to method 200. In various embodiments, the composition of the SiOC precursor sol employed in Step 308 may be the same as the composition of SiOC precursor sol employed in Step 314. In various embodiments, a weight ratio of the components in SiOC precursor suspension employed in Step 308 may be different from a weight ratio of the components in SiOC precursor suspension employed in Step 314.

After the second infiltration, the infiltrated fibrous preform is dried and/or heat treated (Step 316). Step 316 may be similar to drying Step 230 and/or SiOC forming heat treatment Step 240, described above with reference to method 200. SiOC particles may be, at least, partially formed during Step 316. The fibrous preform, which includes SiOC particles may then be further densified using CVI (Step 318). Step 318 may be similar to Step 250, described above with reference to method 200. In various embodiments, Step 318 may result in a C/C composite having a density of at least at least 1.75 g/cc. In various embodiments, the final C/C composite may have a final density of at least 1.8 g/cc.

In accordance with various embodiments, the fibrous preform may be infiltrated at a single stage of the C/C composite fabrication, for example, at the preform level, as shown in Step 220 of FIG. 5, or after a partial pyrolytic carbon densification, as shown in Step 314 of FIG. 6A. In various embodiments, the fibrous preform may be infiltrated during multiple stages of the C/C composite fabrication, as illustrated in Steps 308 and 314 of FIG. 6B. For example, a SiOC precursor sol, as described herein, may be introduced into the fibrous preform before and after one or more drying and/or heat treating (e.g., a SiOC precursor sol infiltration may be performed both before and after Step 310 in FIG. 6B, in accordance with various embodiments). Forming friction disk to include SiOC (e.g., using method 200 or method 300) improves the wear weight of the friction disk as compared to C/C composites. For example, initial wear testing has demonstrated a 30% wear improvement (i.e., 30% less wear) for friction disked formed of C/C including SiOC as compared to C/C composite friction disks.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods, and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method of making a carbon-carbon composite, comprising:
forming a silicon oxycarbide (SiOC) precursor sol;
evacuating a porosity of the fibrous preform in a vacuum chamber;
infiltrating a fibrous preform with the SiOC precursor sol;
facilitating drawing of the SiOC precursor sol into the fibrous preform with the vacuum chamber, including storing the first SiOC precursor sol in a fluid reservoir upstream from the vacuum chamber and delivering the first SiOC precursor sol into the vacuum chamber from the fluid reservoir using a vacuum pump located downstream from the vacuum chamber;
performing a SiOC forming heating treatment on the fibrous preform to form SiOC particles; and
densifying the fibrous preform by chemical vapor infiltration (CVI) to form a densified fibrous preform.

2. The method of claim 1, wherein forming the SiOC precursor sol comprises combining alkyltrimethoxysilane and a carrier fluid.

3. The method of claim 2, wherein the carrier fluid is water.

4. The method of claim 3, wherein performing the SiOC forming heating treatment on the fibrous preform comprises heating the fibrous preform at a temperature of between 700° C. and 1200° C.

5. The method of claim 4, wherein performing the SiOC forming heating treatment on the fibrous preform further comprises heating the fibrous preform in a presence of an inert gas.

6. The method of claim 5, wherein the SiOC forming heating treatment is performed for between 0.5 and 5 hours.

7. The method of claim 3, further comprising partially densifying the fibrous preform prior to infiltrating the fibrous preform with the SiOC precursor sol.

8. The method of claim 1, further comprising partially densifying the fibrous preform, wherein infiltrating the fibrous preform with the SiOC precursor sol comprises:
performing a first infiltration of the fibrous preform with the SiOC precursor sol prior to partially densifying the fibrous preform; and
performing a second infiltration of the fibrous preform with the SiOC precursor sol after partially densifying the fibrous preform.

9. A method of making a carbon-carbon composite, comprising:
partially densifying a fibrous preform;
evacuating a porosity of the fibrous preform in a vacuum chamber;
infiltrating the fibrous preform with a first silicon oxycarbide (SiOC) precursor sol;
facilitating drawing of the first SiOC precursor sol into the fibrous preform with the vacuum chamber, including storing the first SiOC precursor sol in a fluid reservoir upstream from the vacuum chamber and delivering the first SiOC precursor sol into the vacuum chamber from the fluid reservoir using a vacuum pump located downstream from the vacuum chamber;
performing a first SiOC forming heating treatment on the fibrous preform; and
densifying the fibrous preform to form a fully densified fibrous preform.

10. The method of claim 9, further comprising:
performing a first heat treatment on the fibrous preform prior to partially densifying the fibrous preform; and
performing a second treatment on the fully densified fibrous preform.

11. The method of claim 9, further comprising infiltrating the fibrous preform with a second SiOC precursor suspension prior to partially densifying the fibrous preform.

12. The method of claim 11, further comprising performing a second SiOC forming heating treatment on the fibrous preform after infiltrating the fibrous preform with the second SiOC precursor sol and prior to partially densifying the fibrous preform.

13. The method of claim 9, further comprising forming the first SiOC precursor sol by combining methyltrimethoxysilane and a carrier fluid.

14. The method of claim 13, wherein the carrier fluid is water.

15. The method of claim 14, wherein performing the first SiOC forming heating treatment on the fibrous preform comprises heating the fibrous preform at a temperature of between 700° C. and 1200° C.

16. The method of claim 14, wherein the SiOC particles forms between 0.5% and 10.0% of the weight percentage of the fully densified fibrous preform.

17. The method of any of claim 9, wherein performing the first SiOC forming heating treatment on the fibrous preform further comprises heating the fibrous preform in a presence of an inert gas, and the SiOC forming heating treatment is performed for between 0.5 and 5 hours.

18. The method of any of claim 9, wherein the evacuating the porosity of the fibrous preform in the vacuum chamber includes using a trap downstream from the vacuum chamber and the vacuum pump downstream from the trap to pull vacuum in the vacuum chamber.

* * * * *